US008387446B2

(12) United States Patent
Agneray et al.

(10) Patent No.: US 8,387,446 B2

(45) Date of Patent: Mar. 5, 2013

(54) MEASURING DEVICE IN A RADIOFREQUENCY IGNITION SYSTEM FOR INTERNAL COMBUSTION ENGINE

(75) Inventors: Andre Agneray, Boulogne Billancourt (FR); Franck Deloraine, Fontenay aux Roses (FR)

(73) Assignee: Renault S.A.S., Boulogne Billancourt (FR)

( * ) Notice: Subject to any disclaimer, the term of this patent is extended or adjusted under 35 U.S.C. 154(b) by 487 days.

(21) Appl. No.: 12/663,532

(22) PCT Filed: May 14, 2008

(86) PCT No.: PCT/FR2008/050827

§ 371 (c)(1), (2), (4) Date: Apr. 1, 2010

(87) PCT Pub. No.: WO2008/155496

PCT Pub. Date: Dec. 24, 2008

(65) Prior Publication Data

US 2010/0229639 A1 Sep. 16, 2010

(30) Foreign Application Priority Data

Jun. 12, 2007 (FR) ..................................... 07 04191

(51) Int. Cl.
*G01M 15/04* (2006.01)

(52) U.S. Cl. .................................................... 73/114.67

(58) Field of Classification Search ................. 73/35.08, 73/114.08, 114.58, 114.61, 114.62, 114.63, 73/114.67

See application file for complete search history.

(56) References Cited

U.S. PATENT DOCUMENTS

| | | | | |
|---|---|---|---|---|
| 4,601,193 | A | 7/1986 | Blauhut et al. | |
| 5,777,867 | A | 7/1998 | Hongu et al. | |
| 6,075,366 | A | 6/2000 | Yasuda | |
| 6,222,367 | B1 | 4/2001 | Shimizu et al. | |
| 6,920,783 | B2 * | 7/2005 | Kesler | 73/114.08 |
| 8,040,137 | B2 * | 10/2011 | Agneray et al. | 324/393 |
| 2002/0144544 | A1 * | 10/2002 | Kesler | 73/118.1 |
| 2004/0129241 | A1 | 7/2004 | Freen | |
| 2010/0263643 | A1 * | 10/2010 | Agneray et al. | 123/608 |

FOREIGN PATENT DOCUMENTS

| | | |
|---|---|---|
| DE | 198 24 254 | 5/1999 |
| DE | 199 24 001 | 6/2000 |
| EP | 143 970 | 6/1985 |
| EP | 763 759 | 3/1997 |
| EP | 825 343 | 2/1998 |

OTHER PUBLICATIONS

U.S. Appl. No. 13/063,112, filed Mar. 9, 2011, Agneray, et al.

* cited by examiner

*Primary Examiner* — Eric S McCall

(74) *Attorney, Agent, or Firm* — Oblon, Spivak, McClelland, Maier & Neustadt, L.L.P.

(57) ABSTRACT

A measuring device including: a supply circuit for radiofrequency ignition including a transformer including a secondary winding connected to at least one resonator having a resonance frequency higher than 1 MHz, and including two electrodes capable of generating a spark upon an ignition control; a measuring capacitor connected in series between the secondary winding and the resonator; a measuring circuit of ionization current of the combustion gases in a cylinder of the internal combustion engine associated with the resonator, the circuit being connected at terminals of the measuring capacitor; and/or a measuring circuit that measures a voltage at the resonator terminals upon an ignition control, the circuit being connected to terminals of the measuring capacitor.

12 Claims, 2 Drawing Sheets

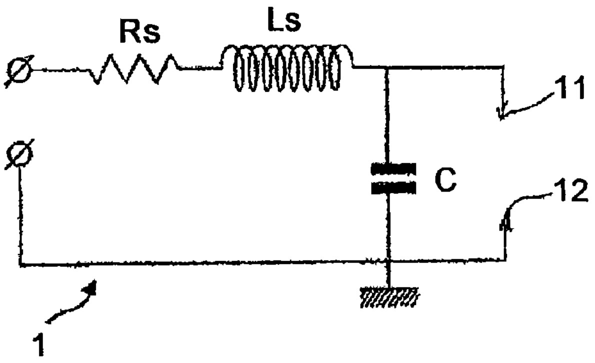
Fig. 1
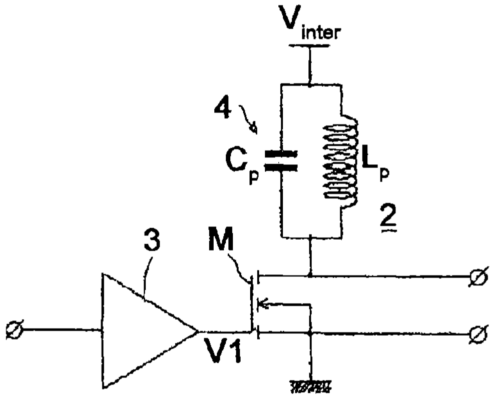
Fig. 2 – Prior Art
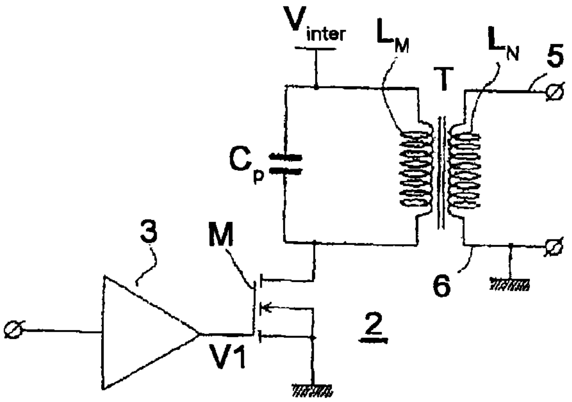
Fig. 3

MEASURING DEVICE IN A RADIOFREQUENCY IGNITION SYSTEM FOR INTERNAL COMBUSTION ENGINE

BACKGROUND

The present invention relates to a measurement device in an electronically controlled microwave ignition system of an internal combustion engine, suitable for measuring the ionization current of the gases in the cylinders of the engine and/or measuring the voltage at the terminals of the electrodes of an ignition spark plug during an ignition command.

The ionization current of the gases in the cylinders of the engine is typically measured after the end of ignition and finds particularly advantageous applications, for example for detecting the angle corresponding to the pressure peak of the combustion chamber, of pinking or else for the identification of misfires.

Circuits for measuring the ionization current for a conventional ignition system are known in which the operation consists in polarizing the mixture of the combustion chamber after the generation of the spark between the electrodes of the ignition spark plug, in order to measure the current resulting from the propagation of the spark.

Such circuits are conventionally placed at the foot of the secondary winding of an ignition coil connected to the spark plug.

These circuits however require being dedicated to the characteristics of conventional ignition and are therefore not adaptable as such to plasma-generation ignition systems, using ignition spark plugs of the microwave coil-on-plug type (BME), as described in detail in the following patent applications filed in the name of the applicant, FR 03-10766, FR 03-10767 and FR 03-10768.

BRIEF SUMMARY

The object of the present invention is therefore notably to propose a device for measuring the ionization current suitable for a microwave ignition system.

Another object is to make it possible, on the basis of the same device, to carry out, whether or not in addition to measuring the ionization current, a measurement of the voltage at the terminals of the electrodes of a microwave coil-on-plug during an ignition command.

With this objective in mind, the invention therefore relates to a measurement device, characterized in that it comprises:

- a circuit for supplying a microwave ignition, comprising a transformer, a secondary winding of which is connected to at least one resonator having a resonance frequency of more than 1 MHz, and comprising two electrodes capable of generating a spark during an ignition command,
- a measurement capacitor, connected in series between the secondary winding and the resonator,
- a circuit for measuring the ionization current of the gases in combustion in a cylinder of an internal combustion engine associated with the resonator, said circuit being connected to the terminals of the measurement capacitor, and/or
- a circuit for measuring the voltage at the terminals of the electrodes of the resonator during an ignition command, said circuit being connected to the terminals of the measurement capacitor.

According to one embodiment, the measurement capacitor is connected in series between the secondary winding of the transformer and the resonator at a ground return wire of the transformer and of the resonator.

Advantageously, the device comprises a damping resistor connected in parallel with a primary winding of the transformer.

According to another feature, the device comprises a direct current power supply connected to the foot of the secondary winding of the transformer.

Preferably, the circuit for measuring the ionization current comprises a circuit differentiating the potential difference between the terminals of the measurement capacitor.

Preferably, the circuit for measuring the voltage at the terminals of the electrodes of the resonator comprises a circuit for rectifying the peak voltage at the terminals of the measurement capacitor.

According to one embodiment, a primary winding of the transformer is connected on one side to a power supply voltage and on the other side to the drain of at least one switching transistor controlled by a command signal, the switching transistor applying the power supply voltage to the terminals of the primary winding at a frequency defined by the command signal.

Advantageously, the transformer comprises a variable transformation ratio.

BRIEF DESCRIPTION OF THE DRAWINGS

Other features and advantages of the present invention will appear more clearly on reading the following description given as an illustrative and nonlimiting example and made with reference to the appended figures in which:

FIG. 1 is a diagram of a resonator modeling a plasma-generation microwave coil-on-plug;

FIG. 2 is a diagram illustrating a supply circuit according to the prior art making it possible to apply an alternating voltage in the range of the microwaves at the terminals of the coil-on-plug;

FIG. 3 is a diagram illustrating a variant of the circuit of FIG. 2.

DETAILED DESCRIPTION

Figure 4:
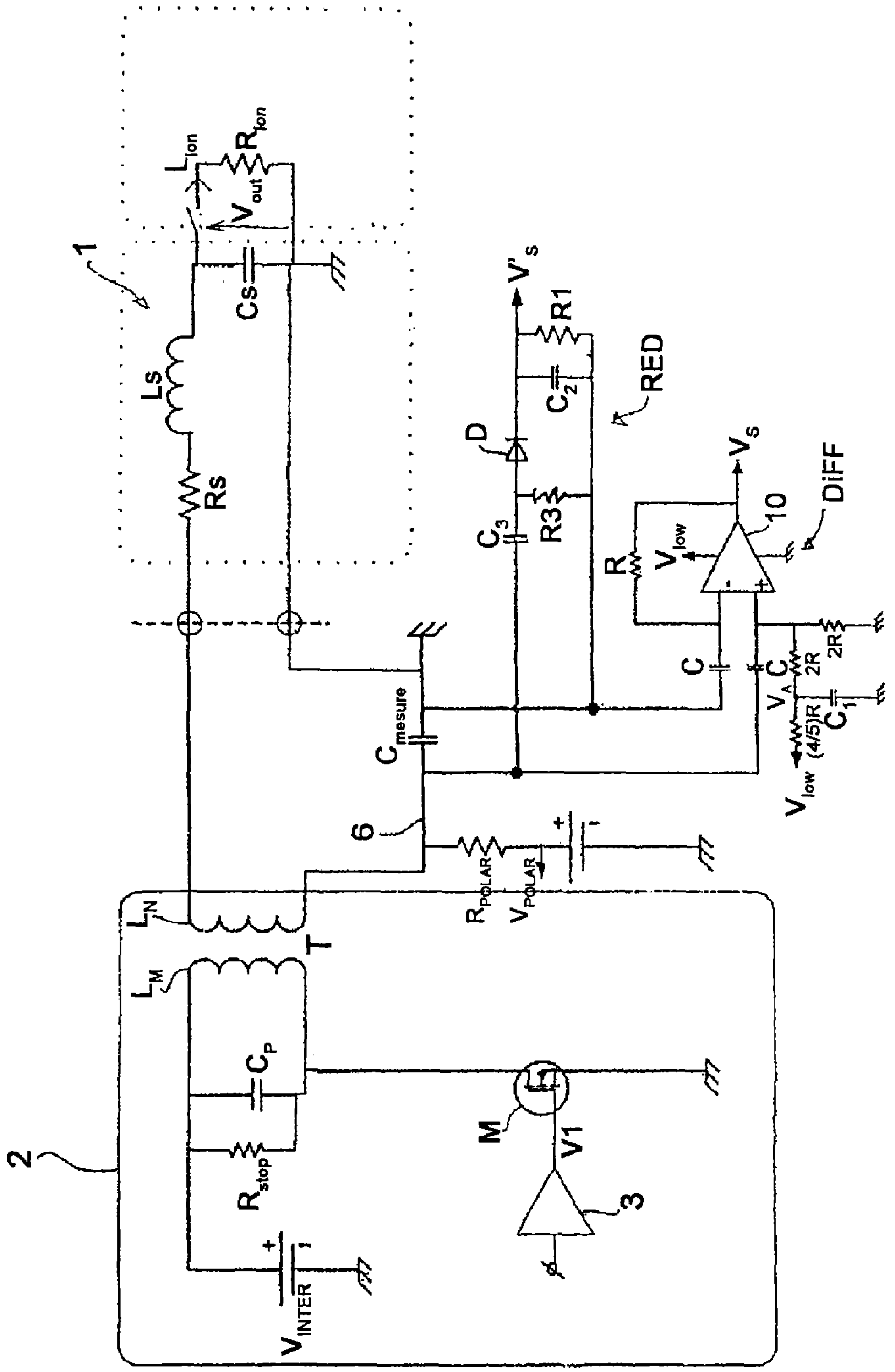
FIG. 4 is a diagram illustrating a supply circuit adapted, according to the invention, to measuring the ionization current and the voltage at the terminals of the electrodes of the plug during an ignition command.

The coil-on-plug used in the context of controlled microwave ignition is electrically equivalent to a resonator 1 (see FIG. 1), the resonance frequency $F_c$ of which is greater than 1 MHz, and typically around 5 MHz. The resonator comprises in series a resistor Rs, an induction coil Ls and a capacitor marked Cs. Ignition electrodes 11 and 12 of the coil-on-plug are connected to the terminals of the capacitor Cs of the resonator, making it possible to generate multifilament discharges in order to initiate the combustion of the mixture in the combustion chambers of the engine, when the resonator is supplied.

Specifically, when the resonator is supplied by a high voltage at its resonance frequency $F_c$ $(1/(2\sqrt{Ls*Cs}))$, the amplitude at the terminals of the capacitor Cs is amplified so that the multifilament discharges develop between the electrodes, over distances of the order of a centimeter, at high pressure and for peak voltages of less than 25 kV.

These are then called ramified sparks, because they imply the simultaneous generation of at least several ionization lines or paths in a given volume, their ramifications also being omnidirectional.

This application to microwave ignition then requires the use of a supply circuit, capable of generating voltage pulses, typically of the order of 100 ns, that can reach amplitudes of the order of 1 kV, at a frequency very close to the resonance frequency of the plasma-generation resonator of the microwave coil-on-plug.

FIG. 2 illustrates schematically such a supply circuit 2, explained moreover in detail in patent application FR 03-10767. The supply circuit of the microwave coil-on-plug conventionally uses an assembly called “Class E pseudo power amplifier”. This assembly makes it possible to create voltage pulses with the aforementioned characteristics.

This assembly consists of an intermediate direct current power supply Vinter that can vary from 0 to 250 V, a MOSFET power transistor M and a parallel resonant circuit 4 comprising a coil Lp in parallel with a capacitor Cp. The transistor M is used as a switch to control the switchings at the terminals of the parallel resonant circuit and of the plasma-generation resonator 1 designed to be connected to an output interface OUT of the supply circuit.

The transistor M is controlled on its grid by a logic command signal V1, supplied by a command stage 3, at a frequency which must be substantially fixed on the resonance frequency of the resonator 1.

The intermediate direct current supply voltage Vinter may advantageously be provided by a high-voltage power supply, typically a DC/DC converter.

Therefore, close to its resonance frequency, the parallel resonator 4 transforms the direct current supply voltage Vinter into an amplified periodic voltage, corresponding to the supply voltage multiplied by the overvoltage coefficient of the parallel resonator and applied to an output interface of the supply circuit at the drain of the switching transistor M.

The switching transistor M then applies the amplified supply voltage to the supply output, at the frequency defined by the command signal V1, that the user seeks to make as close as possible to the resonance frequency of the coil-on-plug, so as to generate the high voltage at the terminals of the electrodes of the coil-on-plug that is necessary to develop and maintain the multifilament discharge.

The transistor therefore switches strong currents at a frequency of approximately 5 MHz and with a drain-source voltage that can reach 1 kV. The choice of the transistor is therefore critical and requires a compromise between voltage and current.

According to a variant illustrated in FIG. 3, the parallel coil Lp is then replaced by a transformer T, having a transformation ratio of between 1 and 5. The primary winding $L_M$ of the transformer is connected, on one side, to the supply voltage Vinter and, on the other side, to the drain of the switching transistor M, controlling the application of the supply voltage Vinter to the terminals of the primary winding at the frequency defined by the command signal V1.

The secondary winding $L_N$ of the transformer, one side of which is connected to ground via a ground return wire 6, is, for its part, designed to be connected to the coil-on-plug. In this manner, the resonator 1 of the coil-on-plug connected to the terminals of the secondary winding by connection wires 5 and 6, including the ground return wire 6, is therefore supplied by the secondary winding of the transformer.

The adaptation of the transformation ratio then makes it possible to reduce the drain-source voltage of the transistor. The reduction in the voltage at the primary winding however induces an increase in the current passing through the transistor. It is then possible to compensate for this stress by placing, for example, two transistors in parallel controlled by the same control stage 3.

FIG. 4 then illustrates an adaptation of the circuit described above, with reference to FIG. 3, to the needs of the invention.

To do this, a measurement capacitor, with a capacitance marked Cmesure in FIG. 4, is first of all provided to be connected in series between the secondary winding of the transformer of the microwave ignition supply circuit 2 and the microwave plasma-generation resonator 1, on the ground return wire 6 of the transformer and the resonator.

As will be seen in greater detail below, based on this same measurement capacitor, it will be possible to measure the ionization current during the combustion of the gases in the chamber and/or to measure the voltage at the terminals of the electrodes of the coil-on-plug during an ignition command.

Equally, a direct current supply providing a voltage Vpolar, that is between 12 and 250 V and that can therefore be the battery voltage or the intermediate direct current supply voltage Vinter, is designed to be connected via a resistor Rpolar, to the foot of the secondary winding of the transformer. The role of this supply is to polarize the high-voltage electrode of the coil-on-plug connected to the output of the supply circuit relative to the cylinder head of the engine.

Finally, a damping resistor Rstop may if necessary be placed in parallel with the primary winding of the transformer T. Such a resistor makes it possible to damp the residual voltage at the terminals of the primary winding once the transistor M is no longer controlled, that is to say after the generation of the spark. The presence of this resistor advantageously makes it possible to take measurements of the ionization current as soon as possible after the end of the ignition command, as will be seen in greater detail below.

The supply circuit of FIG. 3 is specifically adapted to take measurements of the ionization current. The ionization current corresponds to the propagation of the flame edge within the combustion chamber. It is therefore a signal making it possible to monitor the development and the type of combustion that takes place. This ionization current is measurable after the end of the spark for at least 1 ms and has an amplitude of the order of 20 μA. Also, the ionization current is measured after the end of ignition.

More precisely, at 6250 rpm for example, the engine makes a rotation in $10^{-2}$ s, or 26 μs/°. Since a combustion lasts approximately 40° crankshaft, a tolerance of 100 μs (or approximately 4° crankshaft at maximum engine speed) is tolerated after ignition in order to attenuate the dazzling of the measurement circuit caused by the ignition.

As specified above, the damping is improved by the addition of a resistor parallel to the primary winding of the transformer at the output of which the coil-on-plug is connected.

According to the invention, the ionization current is measured at the terminals of the measurement capacitor Cmesure. To do this, a measurement circuit DIFF of the differentiating type is connected to the terminals of the measurement capacitor Cmesure.

The ionization current is therefore measured at the terminals of the measurement capacitor Cmesure during combustion. The equivalent charge during combustion can be modeled by a resistor Rion of approximately 500 kilo ohms, connected in parallel with the capacitor Cs of the plasma-generation resonator 1.

According to the exemplary embodiment of FIG. 4, the differentiating circuit DIFF used to measure the ionization current comprises an operational amplifier 10 supplied by a voltage Vlow, the inverting input of which is connected to a terminal of the measurement capacitor Cmesure via a capacitor marked C, with a value equal, for example, to 100 nF, the noninverting input of which is connected to the other terminal of the measurement capacitor via one and the same capacitor C, and the output Vs of which is looped back to the noninverting input via a resistor, marked R, for example equal to 100 ohms.

The noninverting input is also biased by means of the supply voltage of the amplifier. This voltage Vlow is first of all filtered by a circuit RC, comprising a resistor with a value equal, for example, to 4/5 R, in series with a capacitor C1. The voltage thus filtered $V_A$ is then applied to the noninverting input via a voltage-dividing resistive bridge, consisting of two resistors, each with a value equal to 2 R for example.

The output voltage Vs of the differentiating circuit is therefore the derivative of the potential difference at the terminals of the capacitor Cmes, namely:

$$Vs = R\frac{C}{Cmesure}Iion + \frac{Va}{2} \approx R\frac{C}{Cmesure}Iion + \frac{4}{10}Vlow$$

Iion being the ionization current. Directly deduced from this, then, is the current passing through the capacitor Cmesure, which is the ionization current:

$$Iion \approx \frac{Cmesure}{RC}Vs + Cste$$

where $$Cste = \frac{4Cmesure}{10RC}$$

In addition to be suitable for measuring the ionization current during combustion according to the principles explained above, thanks to the measurement capacitor placed in series between the transformer T and the resonator 1, the supply circuit of FIG. 3 can also be adapted to take a measurement of the voltage Vout at the terminals of the electrodes of the coil-on-plug during an ignition command (that is to say while a command signal is applied to the transistor M). Such a voltage measurement can be used for an optimal control of the development of the spark.

To do this, a rectifier circuit RED is connected to the terminals of the measurement capacitor Cmesure, making it possible to extract the peak voltage at the terminals of the measurement capacitor during an ignition command. The rectifier circuit is produced by placing a diode D in series with a resistive load with a value R1, chosen for example to be equal to 100 ohms, at the terminals of which, during an ignition command, a voltage V's is obtained which is advantageously proportional to the high voltage Vout at the terminals of the electrodes of the coil-on-plug.

Specifically, since the interference capacitances of the transformer are negligible, the galvanic insulation makes it possible to have an identical current through the measurement capacitor Cmesure and the capacitor Cs of the resonator 1 modeling the coil-on-plug. This therefore gives a capacitive divider according to the relationship (considering the difference induced by the voltage drop at the terminals of the diode D to be negligible):

$$\frac{V's}{Vout} = \frac{Cs}{Cmesure}$$

For example, where Cs=20 pF, Cmesure=40 nF and Vout being between 0 and 24 kV, the following result is obtained:

$$0 \leq V's \approx \frac{Vout}{2000} \langle 12V$$

For the purpose of optimizing the rectifier circuit, it is possible to place, upstream of the diode D and in series with the latter, a disconnection capacitor, marked C3 in FIG. 4, with a value for example equal to 100 nF, and a resistor R3 to ground, for the purpose of eliminating the direct current component of the signal at the input of the rectifier circuit. A capacitor marked C2, with a value for example equal to 1 nF, in parallel with the resistive load at the output of the rectifier circuit makes it possible to store the peak value of the voltage.

Therefore, measuring the voltage at the terminals of the measurement capacitor Cmes during an ignition command advantageously makes it possible to obtain a measurement that is the image of the voltage at the terminals of the electrodes of the coil-on-plug.

Such a measurement advantageously makes it possible:

to know the breakdown voltage of the coil-on-plug, to carry out a search for the resonance frequency of the resonator 1 by searching for the maximum amplification, to identify a bridging (that is to say a sudden discharge of the capacitor Cs of the resonator leading to a single spark rather than a ramified spark) by instantaneous collapse of the measurement amplitude, and also to diagnose a disconnection between the supply circuit and the coil-on-plug.

The solution described in the context of the present application therefore makes it possible, based on the same measurement capacitor mounted in series at the output of the supply circuit of microwave ignition, to carry out both the measurement of the ionization current and the measurement of the voltage at the terminals of the electrodes of the coil-on-plug during an ignition command, or else one or other only of these measurements, depending on whether it is chosen to integrate the two circuits described above for the purposes of taking these measurements at the terminals of the capacitor Cmesure, or only one or other of these circuits.

The invention claimed is:

1. A measuring device, comprising:

at least one resonator having a resonance frequency of more than 1 MHz, the resonator comprising two electrodes configured to generate a spark during an ignition command;

a first circuit that supplies a microwave ignition, comprising a transformer, a secondary winding of which is connected to the resonator;

a measurement capacitor, connected in series between the secondary winding and the resonator;

a second circuit that measures ionization current of gases in combustion in a cylinder of an internal combustion engine associated with the resonator, the second circuit being connected to terminals of the measurement capacitor; and a third circuit that measures the voltage at the terminals of the measurement capacitor, the voltage at the terminals of the measurement capacitor being proportional to the voltage at terminals of the electrodes of the resonator during an ignition command, and the third circuit comprises a circuit for rectifying a peak voltage at the terminals of the measurement capacitor.

2. The device as claimed in claim 1, wherein the measurement capacitor is connected in series between the secondary winding of the transformer and the resonator at a ground return wire of the transformer and of the resonator.

3. The device as claimed in claim 1, further comprising a damping resistor connected in parallel with a primary winding of the transformer.

4. The device as claimed in claim 1, wherein the second circuit for measuring the ionization current comprises a circuit differentiating the potential difference between the terminals of the measurement capacitor.

5. The device as claimed in claim 1, wherein a primary winding of the transformer is connected on a first side to a power supply voltage and on a second side to a drain of at least one switching transistor controlled by a command signal, the switching transistor applying the power supply voltage to the terminals of the primary winding at a frequency defined by the command signal.

6. The device as claimed in claim 1, wherein the transformer comprises a transformation ratio of between 1 and 5.

7. A measuring device, comprising:

at least one resonator having a resonance frequency of more than 1 MHz, the resonator comprising two electrodes configured to generate a spark during an ignition command;

a first circuit that supplies a microwave ignition, comprising a transformer, a secondary winding of which is connected to the resonator;

a measurement capacitor, connected in series between the secondary winding and the resonator;

a second circuit that measures ionization current of gases in combustion in a cylinder of an internal combustion engine associated with the resonator, the second circuit being connected to terminals of the measurement capacitor;

a third circuit that measures the voltage at the terminals of the measurement capacitor, the voltage at the terminals of the measurement capacitor being proportional to the voltage at terminals of the electrodes of the resonator during an ignition command; and a direct current power supply connected to a foot of the secondary winding of the transformer.

8. The device as claimed in claim 7, wherein the measurement capacitor is connected in series between the secondary winding of the transformer and the resonator at a ground return wire of the transformer and of the resonator.

9. The device as claimed in claim 7, further comprising a damping resistor connected in parallel with a primary winding of the transformer.

10. The device as claimed in claim 7, wherein the second circuit for measuring the ionization current comprises a circuit differentiating the potential difference between the terminals of the measurement capacitor.

11. The device as claimed in claim 7, wherein a primary winding of the transformer is connected on a first side to a power supply voltage and on a second side to a drain of at least one switching transistor controlled by a command signal, the switching transistor applying the power supply voltage to the terminals of the primary winding at a frequency defined by the command signal.

12. The device as claimed in claim 7, wherein the transformer comprises a transformation ratio of between 1 and 5.

* * * * *